March 26, 1957 C. L. DAY ET AL 2,786,355
FLUID ANALYZING SYSTEM AND SAMPLING DEVICE
Filed April 16, 1953 5 Sheets-Sheet 5
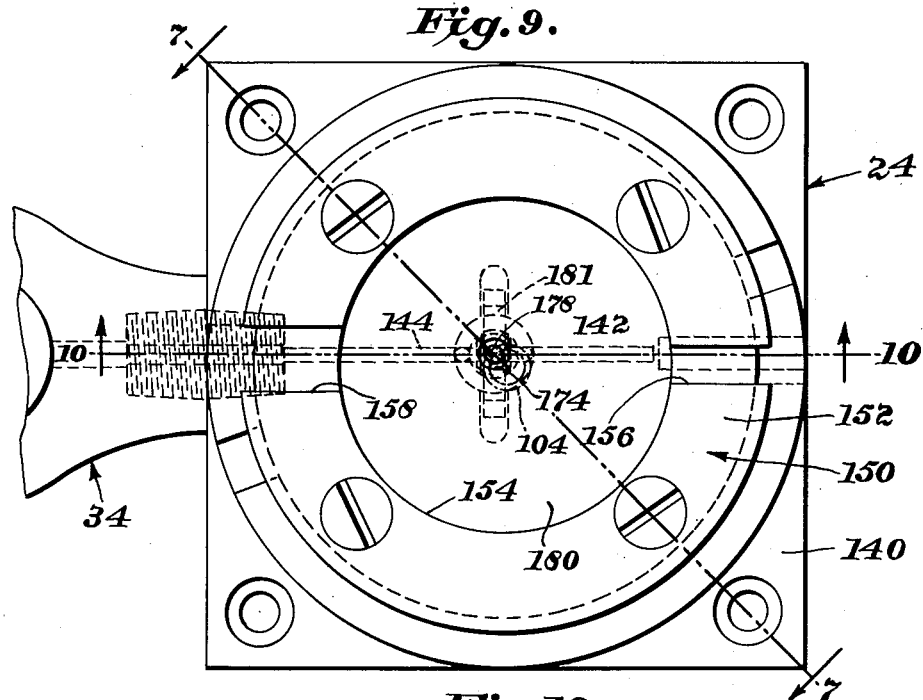
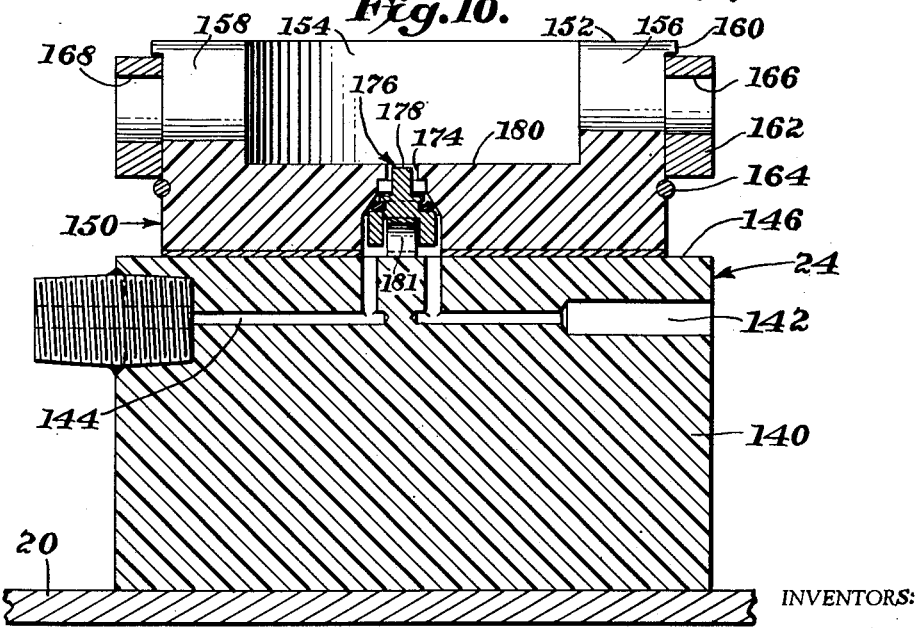
INVENTORS:
Carl L. Day,
Ransom C. Albrecht,
BY
ATTORNEYS.

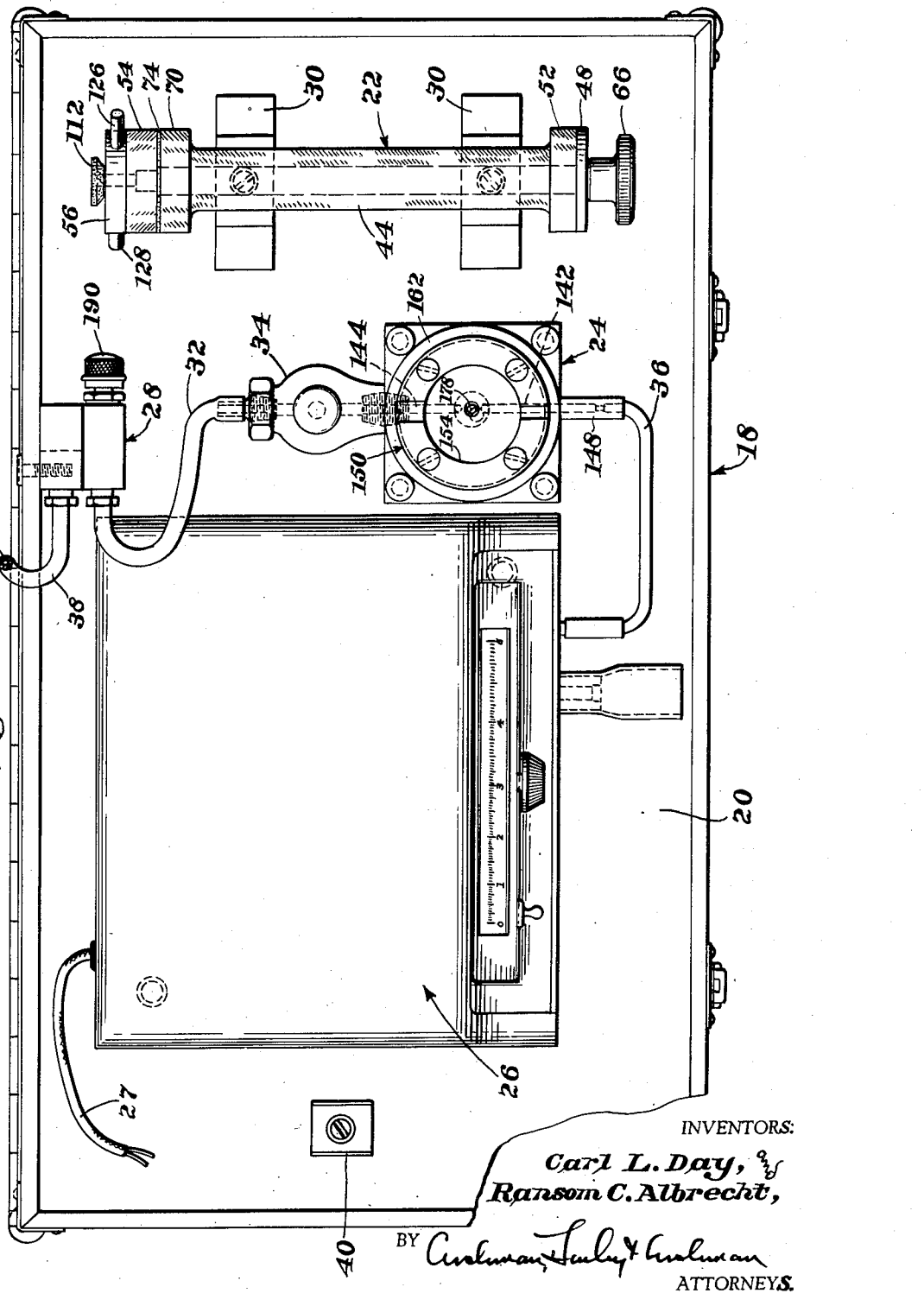

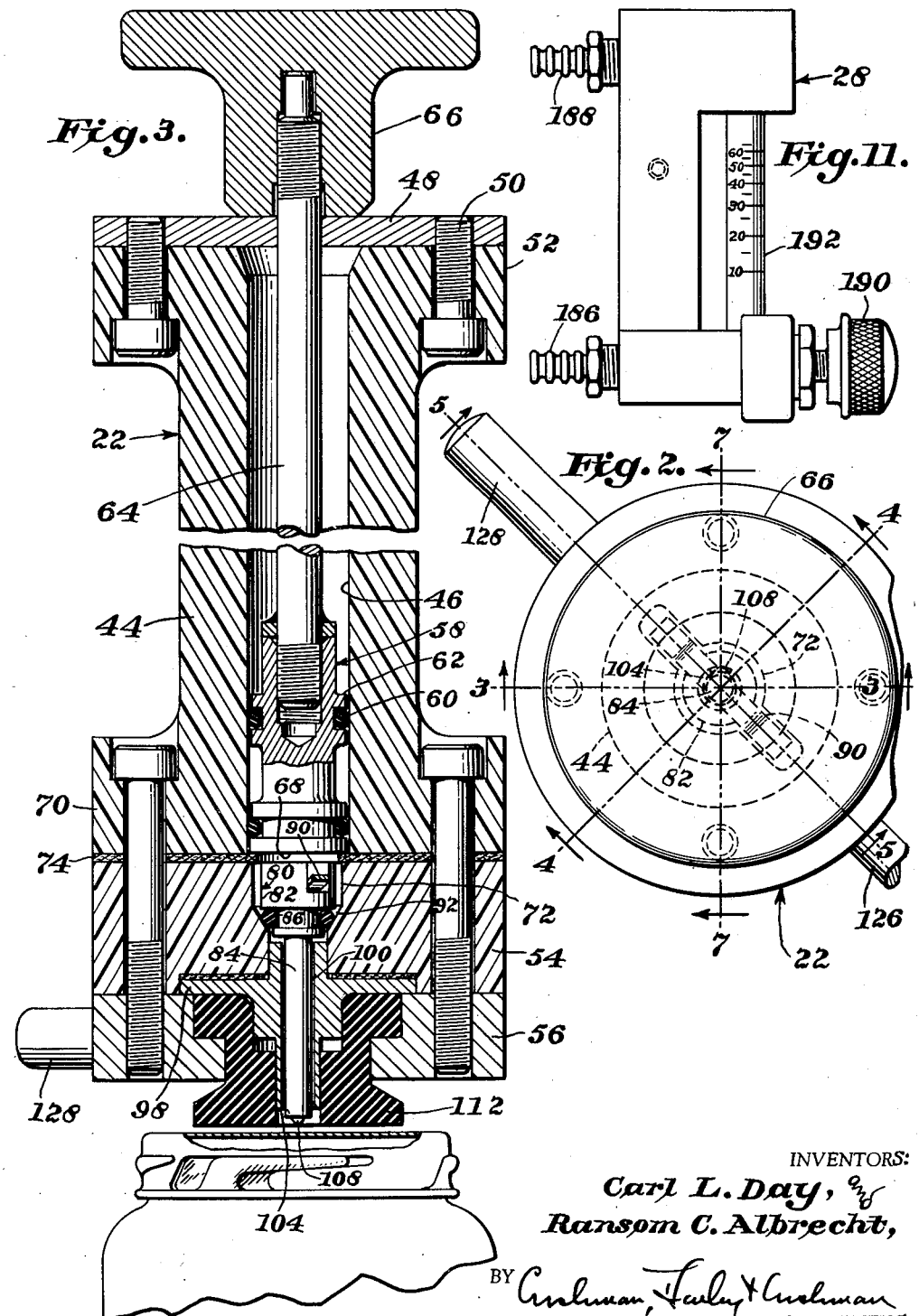

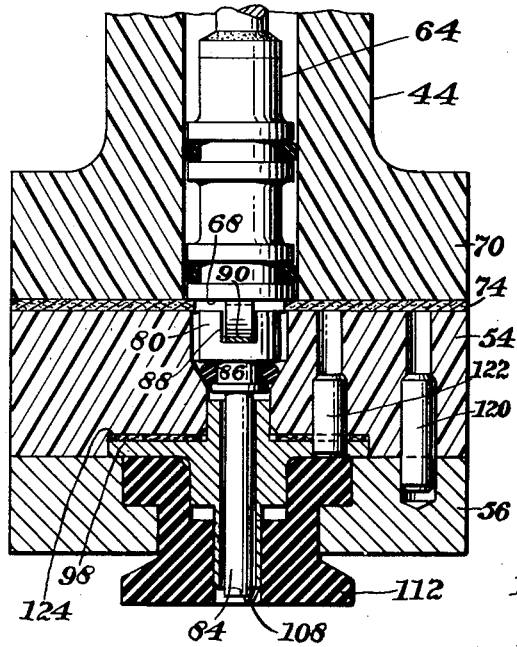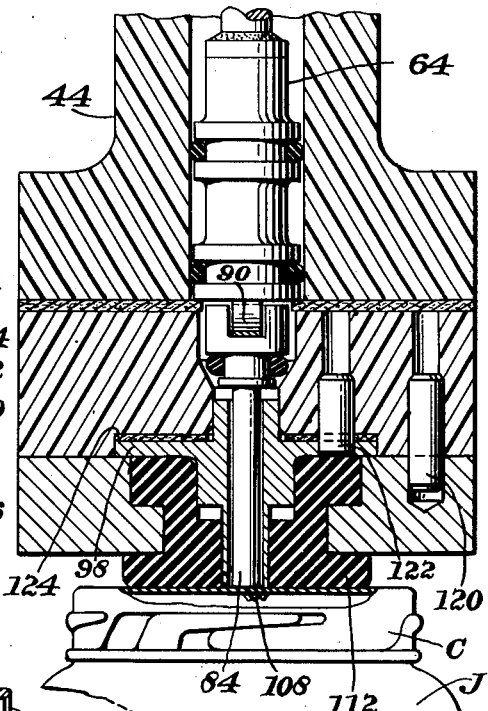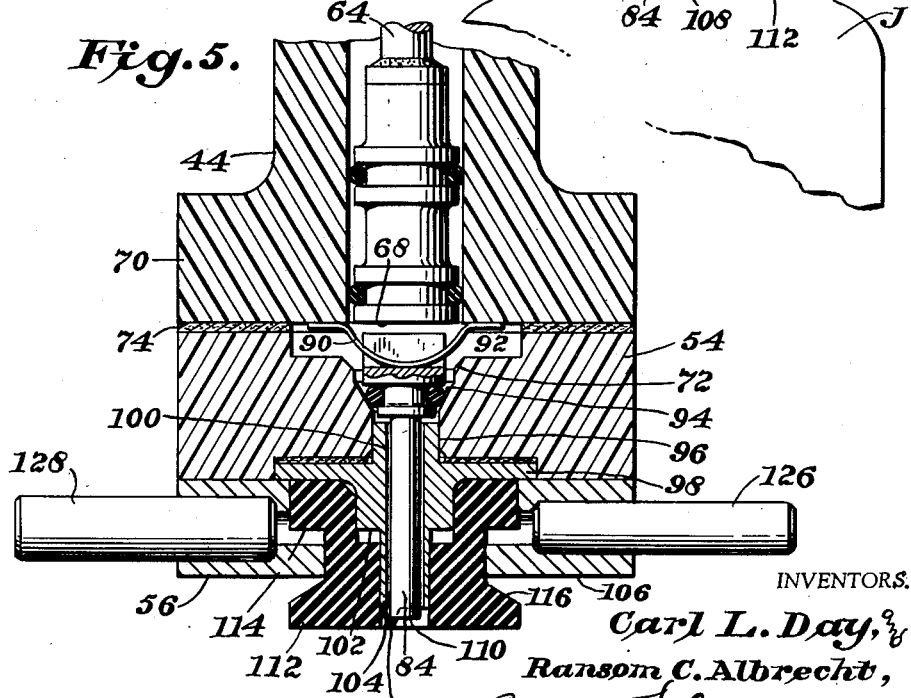

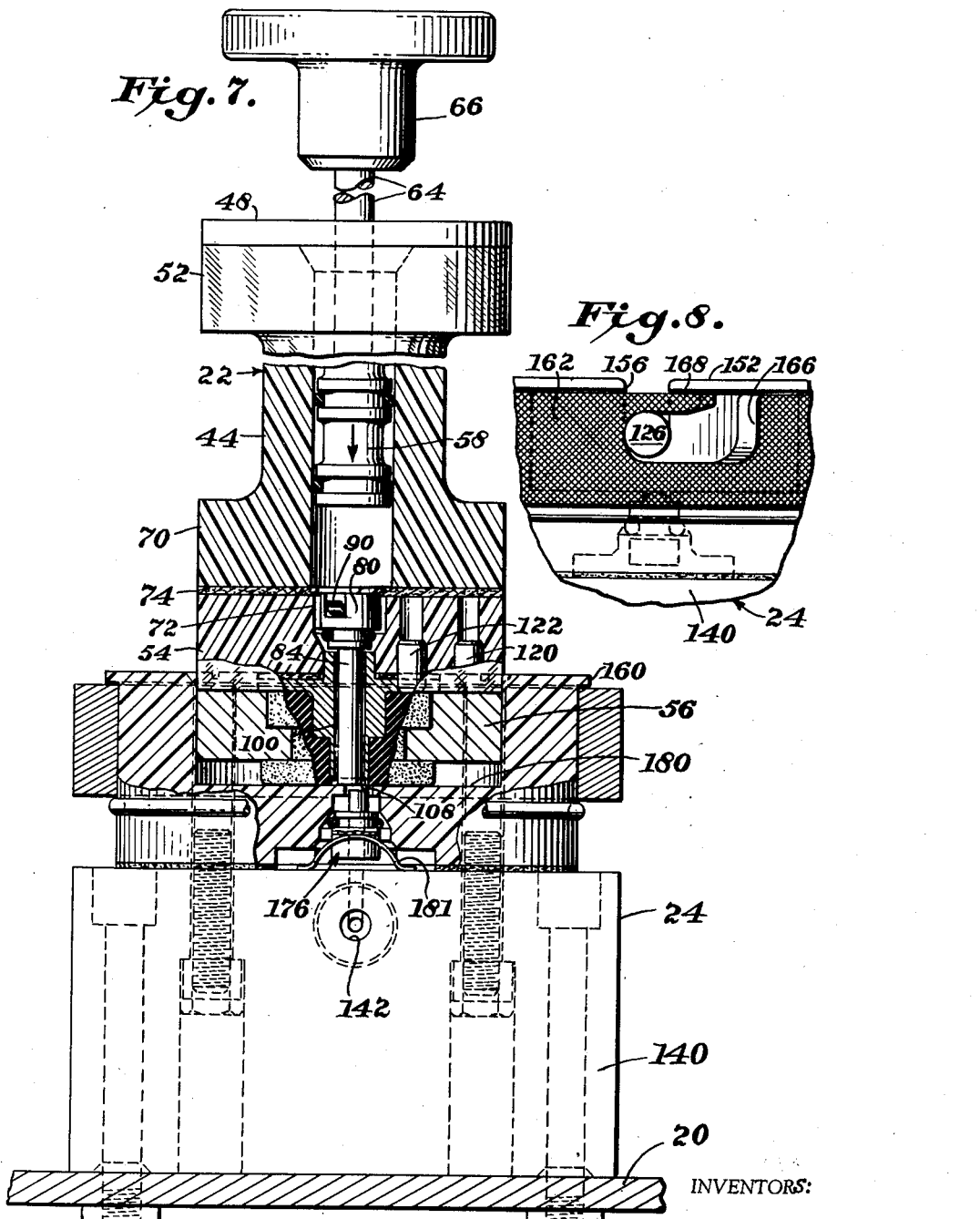

United States Patent Office 2,786,355
Patented Mar. 26, 1957

2,786,355

FLUID ANALYZING SYSTEM AND SAMPLING DEVICE

Carl L. Day and Ransom C. Albrecht, Baltimore, Md., assignors to Crown Cork & Seal Company, Inc., Baltimore, Md., a corporation of New York Application April 16, 1953, Serial No. 349,234

6 Claims. (Cl. 73—421.5)

The present invention relates to a fluid analyzing system, and a sampling device for use therewith.

In the packaging of various materials, for example, food products, it is desirable to so perform the packaging procedure that air and, more particularly, oxygen, will be excluded from the container. In order that the packaging process can be controlled, it is necessary that packages or containers be tested from time to time during the course of a run.

An object of the present invention is to provide a system for readily analyzing flowable materials, for example, gases.

One usual system for analyzing a gas sample involves use of a gas sampling burrette equipped with gas absorption tubes. In the use of such an arrangement, the entire system will be evacuated, if a closed jar is to be tested, the jar closure must be pierced and a sample of the container headspace gas diffused into the evacuated system is forced over into the burrette by a mercury leveling bulb. Analysis of the gas sample then can be made by conventional gas analysis techniques.

Systems such as described above have been found impractical in use in packing plants, especially high production plants. In more detail, while such systems are quite accurate, they require considerable time and extreme care, especially because the sample which can be obtained from any single container is quite small. Moreover, such a system requires a considerable number of valve operations and the equipment is not readily portable.

An object of the present invention is to provide an analyzing system especially adapted for the handling of flowable materials, such as gas, and wherein the components of the system are portable and simple in use, thereby eliminating the necessity of laboratory technique and permitting immediate on-the-spot testing or analyzing.

Another object of the invention is to provide a sampling device for use with analyzing equipment and which is of such design that a sample readily can be obtained from the headspace of a container.

A further object of the invention is to provide a sampling device and coupling device of such design that the sampling device conveniently can be used to first obtain a sample from a container for analysis and then readily connected to the coupling device for delivery of the sample to the analyzing instrument.

Still another object of the invention is to provide an analyzing system of such nature that all of the valve operations required for obtaining a sample and delivering it to the analyzing instrument will be automatically performed upon connection of the devices in sealed relation.

Other objects and advantages of the invention will be apparent from the following specification and accompanying drawings.

In the drawings:

Figure 1 is a plan view showing the equipment assembled in a carrying case, the case being shown open;

Figure 2 is a top plan view of the sampling device;

Figure 3 is an axial section of the sampling device on the line 3—3 of Figure 2 with its parts in normal position;

Figure 4 is an enlarged fragmentary view of the ported end of the sampling device, the view being in axial section on the line 4—4 of Figure 2, and the parts being shown in normal position;

Figure 5 is a view at right angles to Figure 4, being taken on the line 5—5 of Figure 2;

Figure 6 is a view similar to Figure 4 but with the sampling device shown in sealed relation to a container;

Figure 7 shows the sampling device coupled to the test block or receiver of Figure 1, the major portion of the sampling device being in axial section on the line 7—7 of Figure 2 and the upper portion of the receiver being in section on the line 7—7 of Figure 9, except that the sealing ring is partly shown in elevation;

Figure 8 is a fragmentary detail;

Figure 9 is a top plan view of the receiver;

Figure 10 is a vertical section through the receiver on the line 10—10 of Figure 9, and Figure 11 is an elevation of a flow metering device which may be used in the system.

The components or devices used with the present system generally are illustrated in Figure 1 as mounted in a portable carrying case 18 of the general form and size of a small suitcase. In use, case 18 may be placed upon a surface so that one large-area wall 20 will be flat and surrounding fixed walls will be upstanding so that the hinged cover of the case may be lifted. The hinged cover and the body portion may join in a plane which is inclined with respect to wall 20 so that the reading of the analyzer will be facilitated. The devices provided in the case include a sampling device 22, a receiver or test block 24, a gas analyzer 26 and a volume metering device 28. When case 18 is being transported, sampling device 22 will be mounted in brackets 30 fixed to wall 20, the sampler being held on the brackets by any suitable means.

The receiver or test block 24 is permanently secured to wall 20 alongside the gas analyzer 26, which also will be fixed to mentioned wall 20. The meter 28 may be secured to one upstanding wall of case 18. Flexible tubing 32 connects the outlet of flow meter 28 to the inlet valve fitting 34 of the receiver 24 and another length of tubing 36 extends from the outlet of receiver 24 to the inlet of the gas analyzer 26. A longer length of tubing 38 may be connected to the inlet of metering device 28. In use, this length of tubing will be connected to a source of nitrogen or other background gas for which the gas analyzer 26 would be calibrated. At other times, the tubing 38 can be coiled and held on a coiling frame secured to the cover of case 18. The gas analyzer 26 illustrated in the present embodiment is of the type which analyzes oxygen content of a gas by reliance upon the magnetic susceptibility of oxygen as compared to other gases. Therefore, it will include a power line 27 which may be held in a clamp 40 when the case is being transported.

The gas sampling device 22 is illustrated in axial section in Figure 3 and comprises a cylinder 44 including an axially arranged bore or piston chamber 46. One end of cylinder 44 is closed by an end plate 48 secured to the body of the cylinder by means of machine screws 50 extending through a flange 52 on that end of the cylinder. The body of cylinder 44 preferably is formed of Lucite or other transparent material which readily can be accurately machined. As is indicated in Figure 1, a disk 54 formed of Lucite and a seal retaining ring 56 preferably formed of steel are secured to the end of the cylinder opposite that which carries end plate 48.

A piston 58 is reciprocably mounted in the bore 46 of cylinder 44, the piston preferably being formed of metal. In order to provide a tight seal between piston 58 and the wall of the cylinder bore 46, O-rings 60 of rubber or other suitable resilient material are mounted upon the piston, each O-ring being positioned between a pair of circumferentially extending shoulders 62 on the piston. The O-rings preferably are normally circular in radial section and will have the usual O-ring characteristic of expanding in one direction when pressure is applied thereto in a direction normal to the first direction. For example, gas pressure moving along bore 46 will cause the O-rings to expand in a plane radial of piston 58.

The operating rod 64 of piston 58 extends axially through an aperture in end plate 48, a handle 66 being secured to the outer end of the rod.

As is indicated in Figure 3, when the handle 66 bears upon end plate 48, the working face 68 of piston 58 will be closely adjacent the far end of bore 46.

As has been stated above, cylinder 44 includes a ported disk 54 at its end opposite from plate 48. Disk 54 is of circular form and of the same diameter as the adjacent circumferential flange 70 of cylinder 44. A seal retaining ring 56 of like outside diameter with disk 54 is mounted on disk 54, these two elements being secured to the body of cylinder 44 by means of machine screws extending through the flange 70 and disk 54 and threaded in ring 56.

Disk 54 is provided with a central port including a recess 72 of slightly less diameter than the cylinder bore 46. A sealing gasket 74 is positioned between the opposed faces of cylinder 44 and disk 54, the gasket being provided with a central aperture which preferably is of less diameter than recess 72. By this arrangement, the gasket and the surface of disk 54 about recess 72 serve as a stop for inward movement of piston 58.

As is indicated in Figures 3 and 4, recess 72 has a valve 80 positioned therein, valve 80 including a head 82 which is of disk-like form and an axial stem 84. An O-ring 86 of the type discussed above is positioned on stem 84 to lie between the outer end of head 82 and a circumferential flange on the stem. The inner face of valve head 82 is provided with a diametrically extending slot 88 in which a bowed spring 90 is positioned. As best shown in Figure 5, the ends of the spring 90 lie in diametrically opposite extensions 92 of recess 72 and bear upon the opposed end wall of the cylinder body 44. Spring 90 thereby normally holds the valve 80 outwardly so that O-ring 86 will bear upon a conical axial extension 92 of recess 72.

Beyond conical recess 92, a bore 96 extends outwardly to open to a relatively large circular recess in which a collar 98 is fitted. Collar 98 includes a central bore 100 which extends through flanges on both faces of the collar. Valve stem 84 lies centrally of bore 100 to provide an annular passageway of relatively small radial dimension between stem 84 and bore 100.

The flange 102 on the outer face of the collar 98 includes a tubular extension 104 which is thin-walled to be of reduced outside diameter. The outer end of extension 104 lies some distance outwardly of the outside face 106 of the ring 56 and this end lies in a plane normal to the axis of collar 98 except that it includes an outwardly projecting tang 108 which is sharpened to form a cutting point. It will be observed from Figures 3 and 4 that when the valve 80 is in normal closed position, the outer end 110 of the valve stem 84 will lie between the outer end of the tank 108 and the other end of the remaining outer end surface of extension 104.

A compressible sealing ring or gasket 112 surrounds extension 104, as well as the flange 102 of collar 98. Sealing gasket 112 includes an inner flange which lies within an annular recess 114 of ring 56. Outwardly of ring 56, gasket 112 is enlarged as indicated at 116. It will be observed from Figures 3 and 4 that some space may be left between the inner surface of gasket 112 and the outer end of collar flange 102 to thereby permit the gasket to be forced inwardly under compression.

As best shown in Figures 4 and 6, a pin 120 extends between the plate 54 and the ring 56 and a second pin 122 extends between the plate 54 and the collar 98. The purpose of these pins is to insure that these elements only can be assembled in the oriented relationship illustrated in the drawings and the purpose of which relationship is subsequently made clear. A flat gasket 124 also is provided between the inner surface of collar 98 and the opposed surface of the plate 54 and pin 122 extends through this gasket.

The outer ring 56 is provided on its periphery with a pair of diametrically projecting pins 126 and 128. While these pins are of the same length, pin 128 is of slightly greater diameter than pin 126 for the purpose hereinafter described. It will be observed that the periphery of ring 56 which carries the pins 126 and 128 is concentric with valve stem 84 and collar extension or tube 104. Also, the tank 108 on extension 104 lies on an arcuate line which is concentric to all of these surfaces.

The test block or coupling 24 is best illustrated in Figures 7 to 10 and as best indicated in Figures 9 and 10, includes a base portion 140 which is a rectangular block and is adapted to be held to the wall 20 of the carrying case 18 by means of bolts extending through apertures in the corner portions of the block. Base portion 140 also may be formed of Lucite and is provided with two aligned cross bores 142 and 144, each of which includes a right-angled portion extending to the upper face 146 of the block. As hereinafter described, the port 144 has the inlet valve 34 secured thereto. The port 142 may be provided with an outlet fitting 148 as shown in Figure 1. A circular cup-like element 150 also formed of Lucite is fixed to the face 146 of block 140 with a gasket interposed between these two elements. Element 150 includes an upstanding circular flange 152 which surrounds a central recess 154. Flange 152 is provided with two upwardly facing slots 156 and 158, these notches being of a width to respectively receive the large pin 128 and small pin 126. The upper end of the outer surface of element 150 is provided with an outwardly extending flange 160 which guides rotary movement of a holding collar 162. Collar 162 is held upwardly toward flange 160 by a split metal ring 164 positioned in an annular recess surrounding element 150. As is best illustrated in Figure 8, the holding collar 162 is provided with diametrically opposite bayonet-type slots 166 and 168 opening to the upper surface of the collar. Each slot has the lower edge of the free end of its overhanging tongue 168 bevelled as illustrated in Figure 8 so that when the pins 126 and 128 of sampling device 22 are positioned in the cup-like element 150 and holding collar 162 is then rotated to the position illustrated in Figure 8, the pins will be forced further down into the slots 156 and 158.

As is best illustrated in Figures 9 and 10, the coupling element 150 includes a bore 174, the axis of this bore being slightly off-center with respect to the circular surfaces of the flange 152. As is hereinafter explained in more detail, this off-center relationship of bore 174 is such that when the sampling device 22 is positioned in coupling element 150, the tang 108 will be directly aligned with the axis of bore 174.

An upwardly spring closed valve 176 is mounted in bore 174. Valve 176 includes an upwardly extending stem 178 which normally will be positioned to have its upper end just below the inner and flat surface 180 of recess 154. Valve 176 otherwise is similar to the valve 84 of the sampling device 22 in that it is held closed by a bowed spring 181 which bears on the upper face 146 of block 140. In addition, valve 176 is provided with an O-ring which normally bears against a downwardly enlarged conical surface of bore 174. The lowermost portion of bore 174 is of sufficient diameter that both of the ports 144 and 142 are open thereto.

The volume metering device 28 is illustrated in elevation in Figure 11 and is of known type. It includes an inlet 186 and an outlet 188, the flow through the inlet being adjustable by means of a threaded needle valve including an operating knob 190. Device 28 is of such type that flow of gas or fluid therethrough will lift a ball "float" to a height dependent upon the rate of flow of the gas. The ball moves upwardly within a calibrated transparent tube 192. Therefore, if it is desirable to flow a given gas volume per minute, that volume may be obtained by operating the valve knob 190 during flow of gas until the ball is maintained at the proper calibrated line of tube 192.

As has been stated above, the gas analyzing device 26 preferably is of the type which analyzes the oxygen content of a body of gas by reliance upon the magnetic susceptibility of oxygen as compared to other gases. An analyzing device of this type is small, light and highly efficient and can be easily and quickly operated. Therefore, it is extremely convenient in use of the present system in a packing plant.

The operation of the system is as follows: Assume that the system is to be used in a packing plant at which a food product is to be placed in jars J closed by metal caps C of screw type and that all air within the container is to be replaced by a gas such as nitrogen before the cap is sealed to the container. In other words, assume it is desired that the oxygen-containing atmosphere is to be removed from the container and container headspace before the container is sealed. In performing the above procedure, it may be desirable to "sample" filled containers at intervals to make certain that the air removal is being performed to an optimum degree. However, the more usual procedure is to fill a container with water to the proper filling height and move the container through whatever air replacement and capping mechanism is provided, and then test such containers. The testing of water-filled containers after they have been moved through the air replacement apparatus obviously gives as good an indication of the efficiency of such apparatus as could be obtained by the testing of containers filled with the actual product and avoids all possibility of the packed product adhering to the testing devices.

In accordance with the present system, a removed jar J would be placed upon a suitable support and the sampling device 22 positioned above the same as shown in Figure 3, that is, with the piston 58 in inward position. The device 22 then would be pressed firmly upon the top wall of the closure C, thereby forcing the sealing ring 112 into firm contact with the closure to seal device 22 to the upper wall of the closure. Continued downward pressure upon the device 22 will cause the tang 108 to pierce the top wall of the container as shown in Figure 6 by reason of the fact that sealing ring 112 is compressible whereas tang 108 is fixed with respect to device 22. When tang 108 has pierced the closure C, continued downward pressure upon device 22 will cause ring 112 to further compress and will bring the outer and now lower end of valve stem 84 into contact with the closure. This will result in the opening of the valve 80. The operator now will draw piston 64 upwardly to thereby draw gas from the headspace of the container and upwardly between valve stem 84 and within bore 100 past valve 80. When the desired quantity of the container gaseous content thus has been obtained, the operator will somewhat relax the pressure which he is applying to the device 22 to hold it against the container cap C. This relaxation of pressure will permit the sealing ring 112 to expand but without breaking the seal between ring 112 and the container cap. Therefore, if the operator now moves the piston 58 inwardly toward valve 80, the sample within the bore 46 will be placed under atmospheric pressure and valve 80 will be free to close because the outer end of its extension or stem 84 will be out of contact with cap C. Then device 22 may be moved further away from the top wall of cap C so that the sealing ring 112 will be entirely separated from the cap and the tang 108 will be drawn clear of the hole pierced in the container closure. Obviously, because valve 80 will close before the seal between ring 112 and the closure C has been broken, no atmospheric gas or air can move past valve 80 and into the cylinder bore.

The operator then will position the sampling device 22 in the mounting or coupling device 24 as generally illustrated in Figure 7, the holding ring 162 at this time being positioned so that the mouths of its slots 166 and 168 are respectively aligned with the slots 156 and 158 of flange 152. Because the pins 126 and 128 only will be received in the slot of the proper size, the device 22 only can be fitted to mounting device 24 in the properly oriented manner. Then the holding ring 162 will be rotated to a position such as indicated in Figure 8. When the inclined surface of each tongue 168 of ring 162 engages the pins 126 and 128, the sampling device 22 will be forced downwardly with respect to the surface 180. During the initial portion of this movement the sealing ring 112 will be brought into securely sealed contact with surface 180 and during the final movement, the tang 108 will engage valve stem 178 to open valve 176 as shown in Figure 7. Due to the fact that the valve 176 and the bore 174 in which it is positioned are aligned with tang 108, when device 22 is thus drawn downwardly, the end 110 of valve stem 84 of sampling device 22 will abut against the surface 180, with the result that the valve 80 of device 22 also will be opened.

With both the valves 80 and 176 thus opened, the operator will move the piston 58 of sampling device 22 downwardly, thereby forcing the contents of cylinder 44 through the passage 142 and into the gas analyzing device 26. It will be understood that the gas analyzing device as well as all of the tubing and the passages of the test block 24 already will have been purged of all gas except the background gas. Assuming that nitrogen is being placed in the containers, nitrogen would be the background gas to be used, and the tube 38 would be connected to a source of that gas and valve 34 opened so that nitrogen can be flowed through the passages of mounting device 24 while valve 176 is closed, this flow continuing to the gas analyzing device 26 so as to purge it of all gas except nitrogen. The flow could be at the rate determined by meter 28.

With the conditions described in the preceding paragraph previously established, downward movement of piston 58 will move the gas from the sampling device 22 through the mounting device 24 and into the gas analyzing device 26 and the operator can obtain a reading of the percentage of oxygen in the sample obtained from the container headspace. A brief initial reading will be with regard to the very small volume of air which can be entrapped within ring 112 and about stem 84 and valve 176. However, this entrapped air is very small with relation to the gas sample and a steady movement of the piston will prevent the air and gas from mixing. Hence, a true reading of the gas sample can be obtained after the entrapped air has moved through the analyzing device 26.

It will be observed that the system described above fulfills all of the objects stated in the opening portion of this specification.

The terminology used in the specification is for the purpose of description and not of limitation, the scope of the invention being described in the following claims.

We claim:

1. In a sampling device, a hollow cylinder closed at one end and including an axial port at its other end opening to an exterior surface of the cylinder lying normal to the axis of the cylinder bore, a piston reciprocable in the cylinder bore, an operating rod for said piston extending through the closed end of said cylinder, a reciprocable valve in the axial port, said valve including a stem extending axially of the cylinder port and outwardly beyond said surface, means to normally hold said valve seated against the inner portion of the cylinder port, an annular compressible member fixed to said surface to encircle said valve stem, said annular member including an exterior radial surface, and a cutting element positioned within the bore of said annular compressible member and outwardly of said valve stem, the cutting edge of said cutting element and the exterior radial surface of said compressible member being positioned beyond the outer end of the stem of said valve.

2. A device of the character described in claim 1 wherein said valve normally engages a conical seat which converges toward said surface.

3. In combination, a sampling device including a housing to provide a chamber, said housing including a port extending from the chamber to the exterior of the housing, a valve in the port including a stem extending to the exterior of the chamber at a given point, piercing means carried by said housing and spaced from said given point, a coupling device including an inlet port, cooperating means on said housing and coupling device to enable said devices to be secured together with their ports in sealed relation to each other, a normally closed valve in the coupling device inlet port so positioned that it will be engaged and opened by said piercing means when said cooperating means are engaged, and means on said coupling device to engage said valve stem to open said valve.

4. A combination of the character described in claim 3 wherein said cooperating means comprises means to secure said housing and coupling device together with said piercing means and inlet valve in axial alignment.

5. A combination of the character described in claim 3 wherein said cooperating means includes means to move said housing and coupling device with respect to each other.

6. A combination of the character described in claim 3 wherein said piercing means is arcuate and concentric with said valve stem.

References Cited in the file of this patent

UNITED STATES PATENTS

| 1,089,390 | Billings | Mar. 10, 1914 |
| 2,212,466 | Bradford | Aug. 20, 1940 |
| 2,457,707 | Newman et al. | Dec. 28, 1948 |
| 2,620,656 | Peterson | Dec. 9, 1952 |
| 2,622,435 | Lucas et al. | Dec. 23, 1952 |